UNITED STATES PATENT OFFICE.

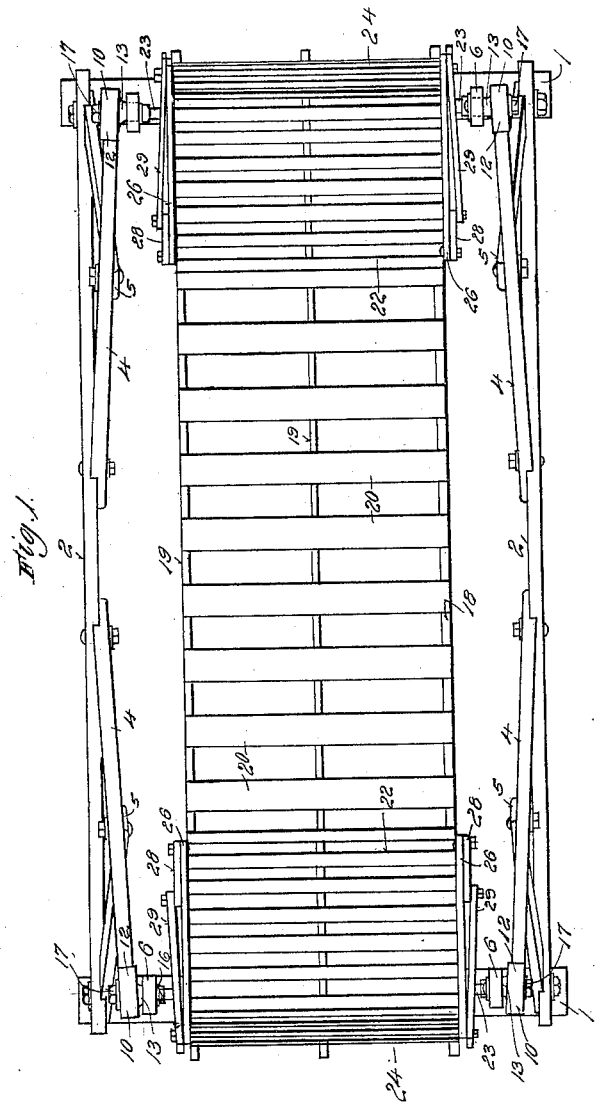

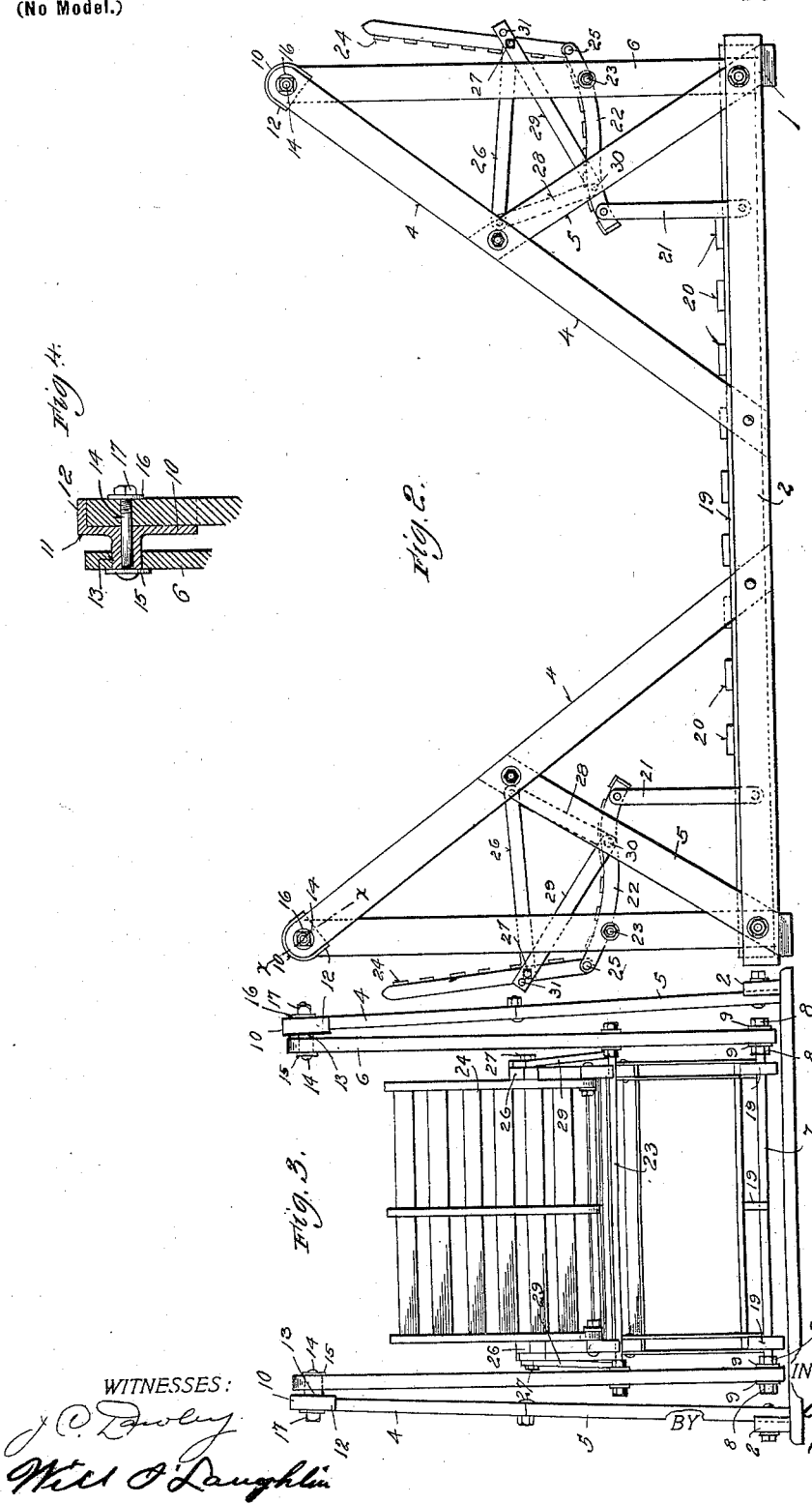

JACOB BANY, SR., OF ST. HENRY, OHIO.

SWING.

SPECIFICATION forming part of Letters Patent No. 705,014, dated July 22, 1902.

Application filed August 15, 1901. Serial No. 72,123. (No model.)

*To all whom it may concern:*

Be it known that I, JACOB BANY, Sr., a citizen of the United States, residing at St. Henry, in the county of Mercer and State of Ohio, have invented certain new and useful Improvements in Swings, of which the following is a specification, reference being had therein to the accompanying drawings.

This invention relates to swings, and has for its object to provide a simple and durable structure of this character which may be readily assembled and taken apart and which is of such a height that it may be used in closed places, such as rooms or porches.

To these and other ends the invention consists in certain novel features, which I will now proceed to describe and will then particularly point out in the claims.

In the accompanying drawings, Figure 1 is a plan view of a swing embodying my invention in one form. Fig. 2 is a side elevation. Fig. 3 is an end elevation, and Fig. 4 is an enlarged detail sectional view taken on the line $x\ x$ of Fig. 2.

In the said drawings I have shown the swing as mounted on a suitable base, comprising cross-pieces 1 and longitudinal members 2, secured thereon and connecting the ends of the cross-pieces. From each corner of the rectangular frame thus formed there arises an upright, (indicated as a whole by the reference-numeral 3,) the said uprights being so arranged that there is a pair of uprights at each end of the frame, the upper ends of the uprights being inclined toward each other to give clearance to the swing-supports, as indicated in Fig. 3. These uprights are not connected with each other at the top, as is usual in swings of this character, but are supported by a system of bracing which enables me to dispense with the top connections, and thus materially decrease the total height of the swing, since it is unnecessary to carry the ends of the uprights sufficiently high to give a clearance for the heads of the users. Preferably each upright is composed of an upwardly and outwardly inclined member 4, extending from a point near the center of the longitudinal member 2 to a point above but slightly to one side of its end, and a downwardly and outwardly inclined member 5, extending from about the middle of the member 4 to the longitudinal member 2 at the end of the latter. Preferably the connections of these members are made by gaining them and bolting them together.

To each upright is pivotally connected a swing supporting-bar 6, and the pairs of bars at each end of the apparatus are connected at their lower ends by a transverse rod 7, threaded at its ends to receive nuts 8, between which the lower ends of the bars are pivotally held, washers 9 being interposed between the nuts and the bars. The pivotal connection of the upper end of each bar is more particularly shown in Figs. 2 and 4, in which 10 indicates a cap, preferably a casting, adapted to fit over the end and one side of the member 4, having a body portion 11, which sets against the inner end of said member, and a flange 12, which embraces the side and end edges thereof. From this casting projects an integral trunnion 13, on which the bar 6 is pivotally mounted. A bolt 14 passes through the upright and trunnion and is provided at its inner end with a washer 15, between the head of the bolt and the trunnion, to hold the bar 6 in position thereon. The other or outer end of the bolt is provided with a washer 16 and nut 17, by means of which the cap is secured to the upright. The two pairs of swinging supporting-arms are connected by means of a platform 18, composed of three longitudinal members 19, which are notched, as indicated in dotted lines in Fig. 2, to slip over the rods 7, with which they are thus pivotally connected. The swinging platform is completed by means of cross bars or slats 20. Near each end of the swinging platform there is pivoted to each side member 19 thereof the lower end of a supporting-bar 21, and to the upper end of said bar is pivoted a seat 22. The rear edge of this seat is notched to fit over and be pivotally connected with a cross-bar 23, connecting the supporting-bars 6. It will thus be seen that a person occupying one of the seats may set the swing in motion by inclining his body and pressing against the platform 19 with his feet. It will also be noted that the entire platform may be readily removed from the supporting-bars by lifting it up, while the seats may be readily folded down upon the platform by lifting them up, so as to disconnect them from the rods 23.

Each seat is provided with a back 24, pivotally connected to the seat at 25 and having at each side a forwardly-extending arm 26, pivoted to the back at 27 and connected to the seat at its front end by a pivoted link 28. This pivotal connection permits the back to be adjusted to any suitable angle of inclination to the seat, and it is secured after adjustment by means of a brace 29, pivotally connected to the seat at 30 by the same pivot-bolt which connects the link 28 thereto. The rear end of this brace is provided with a series of apertures 31, any one of which may be engaged with the pivot-bolt 27, which connects the arm 26 to the back, thereby permitting the back to be secured in position after adjustment.

I do not wish to be understood as limiting myself to the precise details of construction hereinbefore described, and shown in the accompanying drawings, as it is obvious that these details may be modified without departing from the principle of my invention.

Having thus fully described my invention, what I claim as new, and desire to secure by Letters Patent, is—

1. A swing comprising a portable base, independent uprights at the corners of said base, swing supporting-bars pivotally suspended from each upright, rods connecting said bars in pairs at their lower ends and above the same, a platform notched to have a removable pivotal connection with the lower connecting-rods, a seat at each end of the platform notched to have a removable pivotal connection with the upper connecting-rod, and independent supports connected with and supporting the forward edge of each seat, said supports being parallel with the supporting-bars and pivotally connected at their ends to the seat and platform, substantially as described.

2. In a swing of the character described, the combination with a platform and pivotally-mounted bars whereby it is suspended, of a seat pivotally connected to the supporting-bars and having independent supports, parallel with the supporting-bars and pivotally connected at their ends to the seat and platform, a back pivotally connected with the seat, arms having pivotal connections with the back, at one end, pivoted links connecting the other end of the arms to the seats, and adjusting-braces pivoted to the seat at their forward ends by the same connections as the links, and having at their rear ends a plurality of apertures whereby they may be adjustably connected to the back by means of the same pivotal connections as the arms, substantially as described.

In testimony whereof I affix my signature in presence of two witnesses.

JACOB BANY, Sr.

Witnesses:
JOSEPH J. SCHLOSSER,
J. J. BANY.